N. KAVGAS AND W. K. ZWEERES.
BUTTER DISPENSING APPARATUS.
APPLICATION FILED NOV. 16, 1917.
1,312,547.
Patented Aug. 12, 1919.
3 SHEETS—SHEET 3.
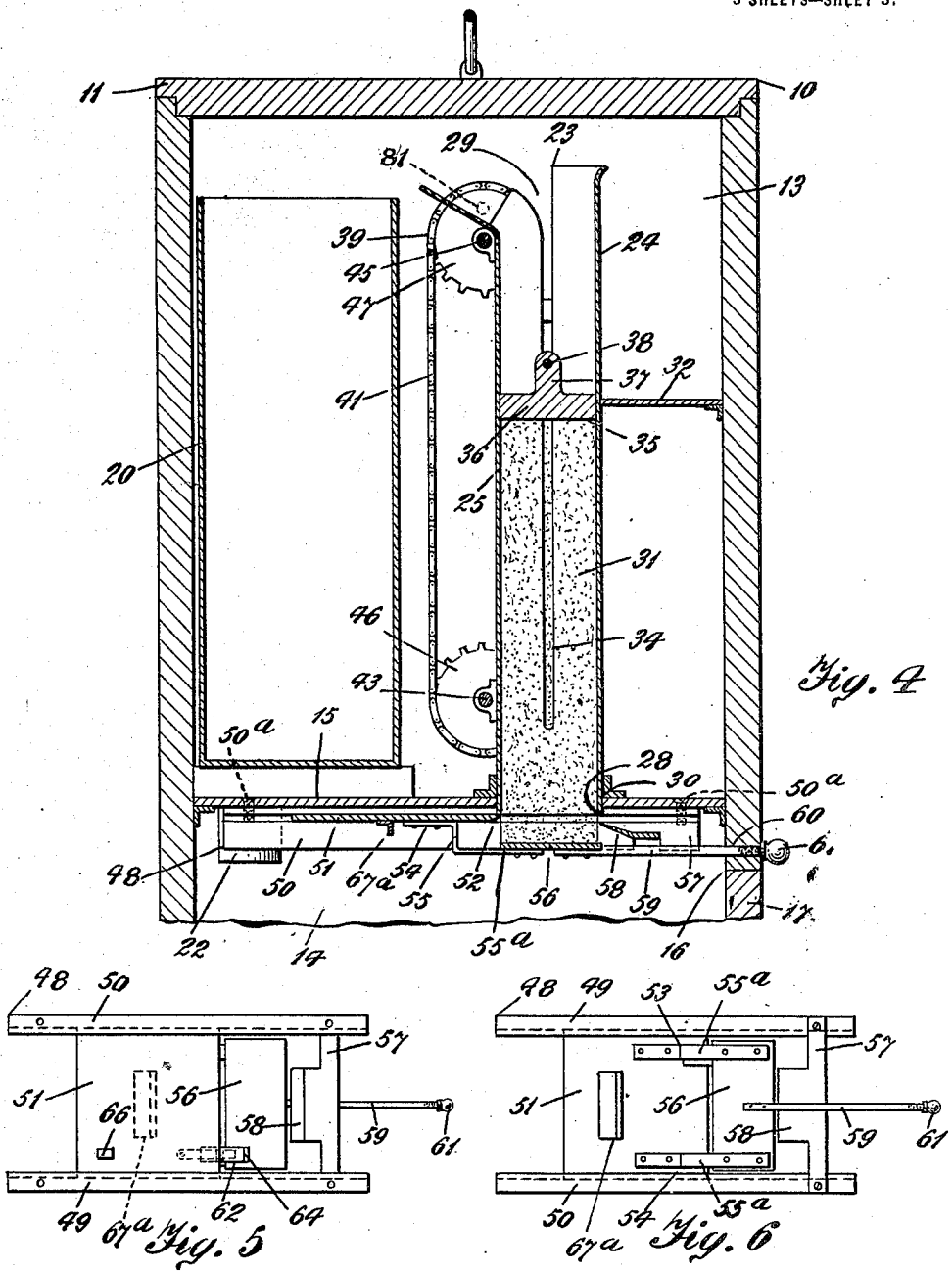

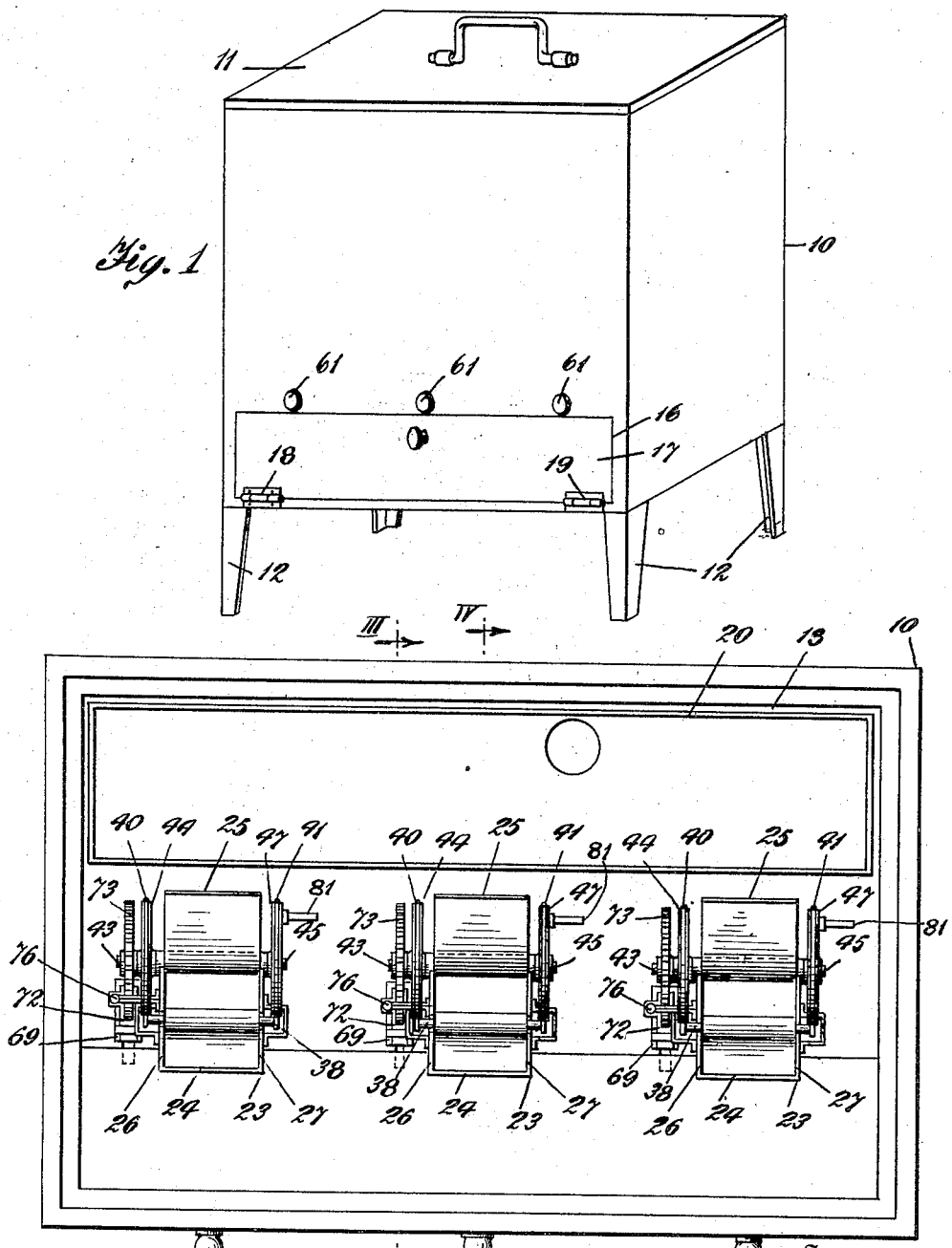

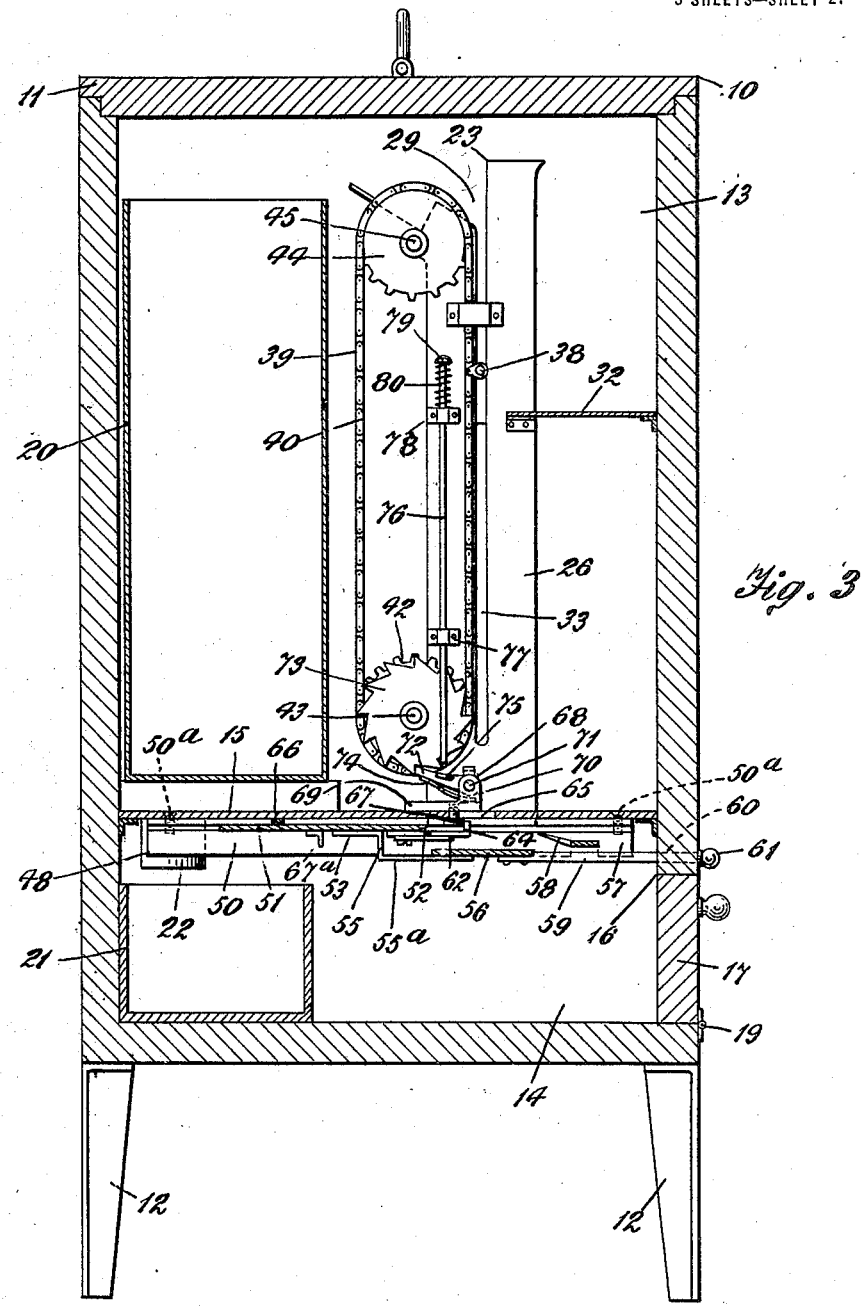

UNITED STATES PATENT OFFICE.

NICKLAUS KAVGAS AND WILLIAM K. ZWEERES, OF BROOKLYN, NEW YORK.

BUTTER-DISPENSING APPARATUS.

1,312,547.  Specification of Letters Patent.  Patented Aug. 12, 1919.

Application filed November 16, 1917. Serial No. 202,346.

*To all whom it may concern:*

Be it known that we, NICKLAUS KAVGAS and WILLIAM K. ZWEERES, a subject of the King of Greece and a citizen of the United States, respectively, both residing in New York, borough of Brooklyn, county of Kings, and State of New York, have invented certain new and useful Improvements in Butter-Dispensing Apparatus, of which the following is a full, clear, and exact specification.

This invention relates more particularly to an improved apparatus of a class disclosed in the patent of Nicklaus Kavgas No. 1,217,953, as well as to the form of apparatus disclosed in our Patent No. 1,253,602 issued January 15, 1918.

Our present invention has for its object primarily to provide a simple, efficient and durable apparatus whereby butter and like food products may be kept in a clean sanitary condition especially in large quantities for consumption in hotels, restaurants and elsewhere, and which is designed to avoid waste of the products by providing for dispensing at a single time of given portions thereof. This is accomplished mainly by providing one or a number of magazines each of a size for holding a suitable quantity of food product especially butter, and each magazine has an inlet and an outlet. In each of the magazines is a follower adapted to be removed predetermined distances for causing given portions of the butter to be discharged through the outlet of the magazine, and each follower is operated by a carrier. At the outlet of each magazine is a cutter for slicing portions of the butter when delivered, and operable by each cutter is a mechanism for moving the carrier of the follower in its respective magazine at intervals whereby determined portions of the contents of the magazine will be discharged through its outlet.

With these and other objects in view, the invention will be hereinafter more particularly described with reference to the accompanying drawings forming a part of this specification in which similar characters of reference indicate corresponding parts in all the views, and will then be pointed out in the claims at the end of the description.

In the drawings, Figure 1 is a perspective view of one form of butter dispensing apparatus embodying our invention.

Fig. 2 is a top plan looking into the apparatus with its cover removed therefrom.

Fig. 3 is a detail sectional view taken on the line III—III of Fig. 2.

Fig. 4 is a fragmentary detail sectional view taken on the line IV—IV of Fig. 2.

Fig. 5 is a top plan of the cutter used in the apparatus, and

Fig. 6 is an inverted plan of the cutter.

In practice we may employ a casing, as 10, of any suitable shape and size for holding one, or a desired number of the apparatus, and for the sake of convenience the casing is preferably substantially rectangular in shape with an open top which is closed by a removable cover 11. The casing may be supported on a number of legs 12, and the interior of the casing may be divided into an upper compartment 13 and a lower compartment 14 by a transverse partition, as 15, arranged between the walls of the casing some distance above its bottom. In the front wall of the casing and leading into its lower compartment is an opening 16 which is opened and closed by a door 17 hinged at 18 and 19 to the casing so as to be swung downwardly and upwardly in and out of the opening. Interiorly of the upper compartment 13 of the casing 10 adjacent to its rear wall may be a suitable receptacle, as 20, for holding ice, and within the lower compartment 14 of the casing may be a tank 21 for receiving the drippings of melted ice from the receptacle 20, this receptacle 20 having in its bottom a drip pipe 22 leading through an opening in the partition 15 into the receptacle 21 for conveying the water from the ice when melted.

When a number of the dispensing apparatus proper are provided in a single casing they are arranged in the upper compartment between the tank 20 and the front wall of the casing 10, and all the apparatus are similarly constructed as well as being separately operable. It will be understood that this invention contemplates the provision and use also of single apparatus, and, therefore, the description of its construction herein given applies to the employment of a plurality of the apparatus the same as the use of one apparatus.

The apparatus has a magazine 23 made preferably in the form of substantially a square, or rectangular tube to provide a front wall 24, rear wall 25, side walls 26 and 27, and the lower open end of the tubular magazine serves as an outlet 28, while the open upper end of the magazine serves as an inlet 29. The lower end of the magazine is arranged in an opening 30 provided in the partition 15 of the casing so that the magazine is disposed in the compartment 13 vertically upward toward the open top of the casing, and the rear and front walls of the magazine may be flared laterally in opposite directions, as shown in Figs. 2 and 4, to allow butter, as 31, or a like food product preferably in the form of a bar to be readily applied in the magazine through its inlet 29 following removal of the cover from the open top of the casing for being discharged through the outlet 28. The magazine may be held rigidly in the casing by its front wall 24 being bracketed, at 32, to the front wall of the casing, and lengthwise of the central parts of the side walls 26 and 27 of the tubular magazine are registered slots 33 and 34.

In the magazine is a follower, as 35, serving to cause a given portion of the contents of the magazine to be discharged through its outlet. The follower 35 is preferably in the form of a plate 36 of a size so as to fit closely, but move freely in the magazine, and projecting upwardly from the top of the plate is an apertured lug 37 with a rod 38 of a length so that its ends protrude through the registered slots 33 and 34. The follower 35 is positioned on top of the butter, or contents of the magazine, and this follower is operated by a carrier, as 39.

The carrier 39 has two belts, or sprocket chains 40 and 41 both of which are movably arranged in closely spaced relation to the side walls of the magazine. The sprocket chain 40 is guided over a sprocket wheel 42 held on one end of a shaft 43 which is journaled on the lower part of the rear wall of the magazine, and this chain also passes over a second sprocket wheel 44 held on one end of a shaft 45 which is journaled on the upper part of the rear wall of the magazine. The sprocket chain 41 passes over a sprocket wheel 46 held on the second end of the shaft 43 as well as being guided over another sprocket wheel 47 held on the second end of the shaft 45. The shafts 43 and 45 are somewhat longer than the width of the magazine to allow of this arrangement of the chains 40 and 41, and these shafts besides the sprocket wheels of each pair are spaced apart sufficient distances, while the sprocket chains are of lengths so that when the chains are driven the follower 35 may be moved back and forth from the inlet 29 to the outlet 28 of the magazine, in order to cause all the butter or contents of the magazine to be dispensed, as will be hereinafter more fully explained.

In conjunction with each magazine we provide a cutter, as 48, for slicing the portions of the butter when discharged from the magazine. The cutter 48 may be of any suitable type, though the cutter is preferably composed of two guides, or grooved bars 49 and 50 which are arranged on the underside of the partition 15 of the casing 10 in spaced parallel relation so that the outlet of the magazine thereabove communicates with the space between the bars. The bars 49 and 50 are also arranged to extend between the front and rear walls of the casing as well as being disposed so that their grooves are in register, as shown, and both of these grooved bars may be screwed, or otherwise secured at 50ª to the transverse partition 15. In the grooves of the bars 49 and 50 is a blade 51 having a cutting edge, as 52, and this blade is movable between the bars so that its cutting edge will pass across the outlet of the magazine. On the underside of the blade 51 of the cutter are provided two depending spaced brackets 53 and 54 both of which are approximatly L-shaped to provide corresponding downwardly projecting arms 55 and longitudinally extending arms 55ª. The longitudinal arms of these brackets are of lengths so that their free ends protrude some distance beyond the cutting edge 52 of the blade 51, and on the top of these arms of the brackets is a fixed plate, or shelf 56 which is of a size somewhat larger than the outlet of the magazine besides being normally disposed directly under the outlet for receiving the portions of the butter discharged through the outlet of the magazine. Moreover, the shelf 56 is spaced under the magazine at a distance whereby the portions of the butter discharged thereon from the magazine will be of given sizes. Across parts of the undersides of the ends of the grooved bars 49 and 50 of the cutter which are opposed to the front wall of the casing is a stationary strip 57 having an upwardly inclined blade, or stop 58 arranged so that its free edge is in opposition to the cutting edge of the blade 51, while both of these blades are spaced apart whereby the cutting edge of the blade 51 is normally positioned at the rear wall of the magazine at its outlet, and the free edge of the stationary blade, or stop 58 is normally positioned at the front wall of the magazine at the outlet 28. On the underside of the shelf 56 of the cutter is fastened one end of a handle 59 which may be in the form of a rod or bar of a length so that its other end is movably disposed through an opening 60 provided in the front wall of the casing 10, and the end of the rod extending through the opening may terminate with a knob, as 61, to allow the handle to be manually pulled for operating the cutter. Protruding from one side of the cutting edge 52 of the blade 51 is a finger, as 62, having an upwardly turned end 64 of a length to extend slightly above this blade as well as being in close proximity to the underside of the partition 15 of the casing 10, and through the partition directly above this turned end of the finger is an elongated slot 65, Fig. 3, provided adjacent to one of the side walls of the magazine. Adjacent to the rear edge of the blade 51 on alinement with the finger 62 is a lug, or stop 66 which also protrudes upwardly from the blade, and this stop together with the finger 62 are in the path of movement of a pin, or bolt 67 of a mechanism, as 68, adapted to operate the carrier 39 when the cutter 48 is operated.

The mechanism 68 has a plate 69 which is arranged on the partition 15 of the casing 10 so as to be moved back and forth toward and from the front wall of the casing over the slot 65 of the partition, and to the central part of this plate is held the bolt 67. Projecting upwardly from the plate 69 is an apertured lug 70 in which is journaled a short shaft 71 on which is held one end of a pawl 72 arranged so that its other end is in movable engagement with a ratchet wheel 73 held on the shaft 43 of the carrier 39. The pawl 72 is normally forced in detachable engagement with the ratchet wheel 73 by a spring 74 having one of its ends fixed to the plate 69 under the shaft 71, and the other end of this spring movably engages the underside of the free end part of the pawl so that the tension of the spring serves to yieldingly force the pawl upwardly. Extending laterally from the pawl 72 is a lug 75 which is disposed in the path of movement of the lower end of a vertically disposed rod 76 which is movably bracketed, at 77 and 78, to the side wall 26 of the magazine 23, and the upper end of this rod may terminate with a head 79. Encircling the rod 76 is a spiral spring 80 having one of its ends abutting against the bracket 78, while the other end of the spring abuts against the head 79 of the rod.

In practice the cutter of each apparatus in the casing 10 is normally arranged so that the cutting edge 52 of its movable blade 51 is positioned at the rear wall 25 of the magazine 23 thereabove. The handle 59 of the cutter will then be guided interiorly of the casing, and the bolt 67 of the mechanism 68 will be between the upwardly turned end 64 of the finger 62 and the lug 66 of the blade 51 as well as being in contact with the upwardly turned end of the finger, as shown in Fig. 3. The outlet of the magazine 23 will thereby be open so that with the charging of the magazine with a food product, such as butter, after the follower 35 of the magazine is guided from its interior through the inlet 29, a portion of the butter will pass from the magazine to the plate 56 of the cutter, this plate being spaced from the magazine to allow of only a given portion of the butter to protrude at a single time beyond its outlet. By then pulling the knob 61 to guide the handle 59 of the apparatus outwardly of the casing 10 the plate 56, brackets 53, 54 and the blade 51 will be moved toward the front of the casing, and the protruding portion of the butter in the magazine will thereby be sliced by the blade 51. In order to prevent the butter from tending to adhere to the underside of the blade 51 when the cutter is operated in this manner extending downwardly from the central part of the underside of the blade is a flange $67^a$ which is so arranged that when the blade is moved sufficient distance to slice a portion of the butter this flange will move in contact with the butter toward the free edge of the inclined stop 58 for serving to force the cut portion of the butter under this stop, and the plate 56 of the cutter being also moved by this operation of the handle will free the sliced portion of the butter from any support thereunder, and the portion of the butter will be dispensed into the lower chamber 14 of the casing for removal following the opening of the door 17 of the casing. The upwardly extending end 64 of the finger 62 and the lug 66 of the cutter are spaced apart a sufficient distance so that when the blade 51 of the cutter is moved a determined distance toward the front of the casing, the lug 66 of the cutter will contact with the bolt 67 of the mechanism 68. This bolt together with the plate 69, lug 70 and shaft 71 of the mechanism will be guided on the transverse partition 15 of the casing a distance corresponding to the movement of the bolt in the slot 65 of the partition. This operation of these parts will free the engagement of the pawl 72 with the ratchet wheel 73 as well as causing the pawl to be likewise moved so that its free end will be forced by the tension of the spring 74 into engagement with the next adjacent tooth of the ratchet. When the handle 59 of the cutter is guided inwardly of the casing the plate 56, brackets 53 and 54, blade 51, finger 62 and lug 66 of the cutter will be reversely operated, and the upwardly turned end 64 of the finger 62 will also cause a reverse movement of the bolt 67, plate 69, lug 70, shaft 71 for likewise moving the pawl 72. The ratchet wheel 73 will then be partially rotated to operate the carrier 39 by revolving the shaft 43. The rotation of this shaft will revolve the sprocket wheels 42 and 46 for driving the sprocket chains 40 and 41 which in turn revolve the sprocket wheels 44 and 47 besides rotating the shaft 45. With this operation of these parts the follower 35 after being positioned in the magazine on top of the butter will be moved downwardly in the magazine to cause a second portion of the butter to be forced through the outlet of the magazine on the plate 56 of the cutter so as to be dispensed in the manner above described. The ratchet wheel 73 is made with its teeth so arranged that with each partial turn of the wheel the carrier 39 will be operated to move the follower 35 a distance in the magazine corresponding to the space between the outlet of the magazine and the plate 56 of the cutter 48. The magazine when emptied of its butter may be recharged by forcing the rod 76 downwardly against the tension of the spring 80. The lower end of the rod will in turn contact with the lug 75 of the pawl 72, and the pawl will be disengaged from the ratchet wheel 73 to allow the carrier 39 to be manually operated, for example, by turning a handle, as 81, which may be provided to extend laterally from the sprocket wheel 47 of the carrier 39 for guiding the follower out of the inlet of the magazine. A suitable quantity of butter may then be placed in the magazine, after which the follower is reguided in the magazine for operating the apparatus as explained.

In the foregoing description, we have embodied the preferred form of our invention, but we do not wish to be understood as limiting ourselves thereto, as we are aware that modifications may be made therein without departing from the principle, or sacrificing any of the advantages of this invention, therefore we reserve to ourselves the right to make such changes as fairly fall within the scope thereof.

Having thus described our invention, we claim as new and desire to secure by Letters Patent:—

1. In a butter dispensing apparatus, a casing with an upper and lower chamber, a stationary magazine in the upper chamber having an inlet and having an outlet leading into the lower chamber, a plate movable in the magazine for forcing portions of the contents of the magazine through its outlet, a blade in the lower chamber of the casing, operable at the outlet of the magazine for slicing the portions of its contents delivered from the magazine, said blade having a handle extending exteriorly of the casing, and said plate being operable with each operation of the blade so that portions of the contents of the magazine of given sizes will be discharged from its outlet into the lower compartment of the casing, and a shelf carried by the blade for receiving the contents delivered from the outlet of the magazine.

2. In a butter dispensing apparatus, a casing with an upper and lower chamber, a stationary magazine in the upper chamber having an inlet and having an outlet leading into the lower chamber, a plate movable in the magazine for forcing portions of the contents of the magazine through its outlet, a blade in the lower chamber of the casing, operable at the outlet of the magazine for slicing the portions of its contents delivered from the magazine, and said blade having a handle extending exteriorly of the casing, belts supporting the plate, and mechanism in the upper chamber of the casing, operable by the slicing blade to operate the belts for moving the plate in the magazine at intervals so that portions of the contents of the magazine of given sizes will be discharged from its outlet into the lower compartment of the casing.

3. In a butter dispensing apparatus, a casing with an upper and lower chamber, a stationary magazine in the upper chamber having an inlet and having an outlet leading into the lower chamber, a plate movable in the magazine for forcing portions of the contents of the magazine through its outlet, a blade in the lower chamber of the casing, operable at the outlet of the magazine for slicing the portions of its contents delivered from the magazine, and said blade having a handle extending exteriorly of the casing, belts supporting the plate, mechanism in the upper chamber of the casing, operable by the slicing blade to operate the belts for moving the plate in the magazine at intervals so that portions of the contents of the magazine of given sizes will be discharged from its outlet into the lower compartment of the casing, and a shelf carried by the blade for receiving the contents delivered from the outlet of the magazine.

4. The combination, in a butter dispensing apparatus, with a stationary magazine having an inlet and an outlet, of a movable plate in the magazine, a manually operable blade at the outlet of the magazine for slicing portions of the contents delivered from the magazine, belts on which the plate in the magazine is carried, and mechanism operable by the operation of the slicing blade to move the plate in the magazine at intervals so that given size portions of the contents of the magazine will be discharged from its outlet.

5. The combination, in a butter dispensing apparatus, with a plurality of stationary magazines each having an inlet and an outlet, of movable plates one in each magazine, manually operable blades one at the outlet of each magazine for slicing portions of the contents delivered from the magazine, a pair of belts on which the plate of each magazine is carried, and mechanism operable by the operation of each slicing blade to move the plate in one of the magazines at intervals so that given size portions of the contents of the magazine will be discharged from its outlet.

This specification signed and witnessed this 15th day of November, A. D. 1917.

NICKLAUS KAVGAS.
WILLIAM K. ZWEERES.

Witnesses:
E. W. JONES,
C. M. SCHOBER.

Copies of this patent may be obtained for five cents each, by addressing the "Commissioner of Patents, Washington, D. C."